Oct. 22, 1940.　　　J. A. SHULTZ　　　2,218,896
HYDRAULIC TRANSMISSION
Filed Nov. 30, 1939　　4 Sheets-Sheet 1

Inventor
JESSE A. SHULTZ,
By Clarence A. O'Brien
and Hyman Berman
Attorneys

Oct. 22, 1940.   J. A. SHULTZ   2,218,896
HYDRAULIC TRANSMISSION
Filed Nov. 30, 1939   4 Sheets-Sheet 3

Inventor
JESSE A. SHULTZ,

By Clarence A. O'Brien
and Hyman Berman
Attorneys

Inventor
JESSE A. SHULTZ,

Patented Oct. 22, 1940

2,218,896

UNITED STATES PATENT OFFICE 2,218,896

HYDRAULIC TRANSMISSION

Jesse Albert Shultz, St. Joseph, Mo.

Application November 30, 1939, Serial No. 306,995

2 Claims. (Cl. 74—294)

The present invention relates to new and useful improvements in hydraulic transmissions particularly for motor vehicles but it will be understood, of course, that the device may be used for any other purpose for which it may be found adapted and desirable.

The primary object of the invention is to provide, in a manner as hereinafter set forth, a hydraulic transmission comprising a novel combination and arrangement of gears, fluid pumps, governor, etc., for automatically connecting a driven shaft to a driving shaft and for controlling the speed of the former relative to the latter.

Other objects of the invention are to provide a hydraulic transmission of the character described which will be comparatively simple in construction, strong, durable, highly efficient and reliable in use, compact and which may be manufactured at low cost.

All of the foregoing and still further objects and advantages of the invention will become apparent from a study of the following specification, taken in connection with the accompanying drawings wherein like characters of reference designate corresponding parts throughout the several views, and wherein.

Figures 1, 2:
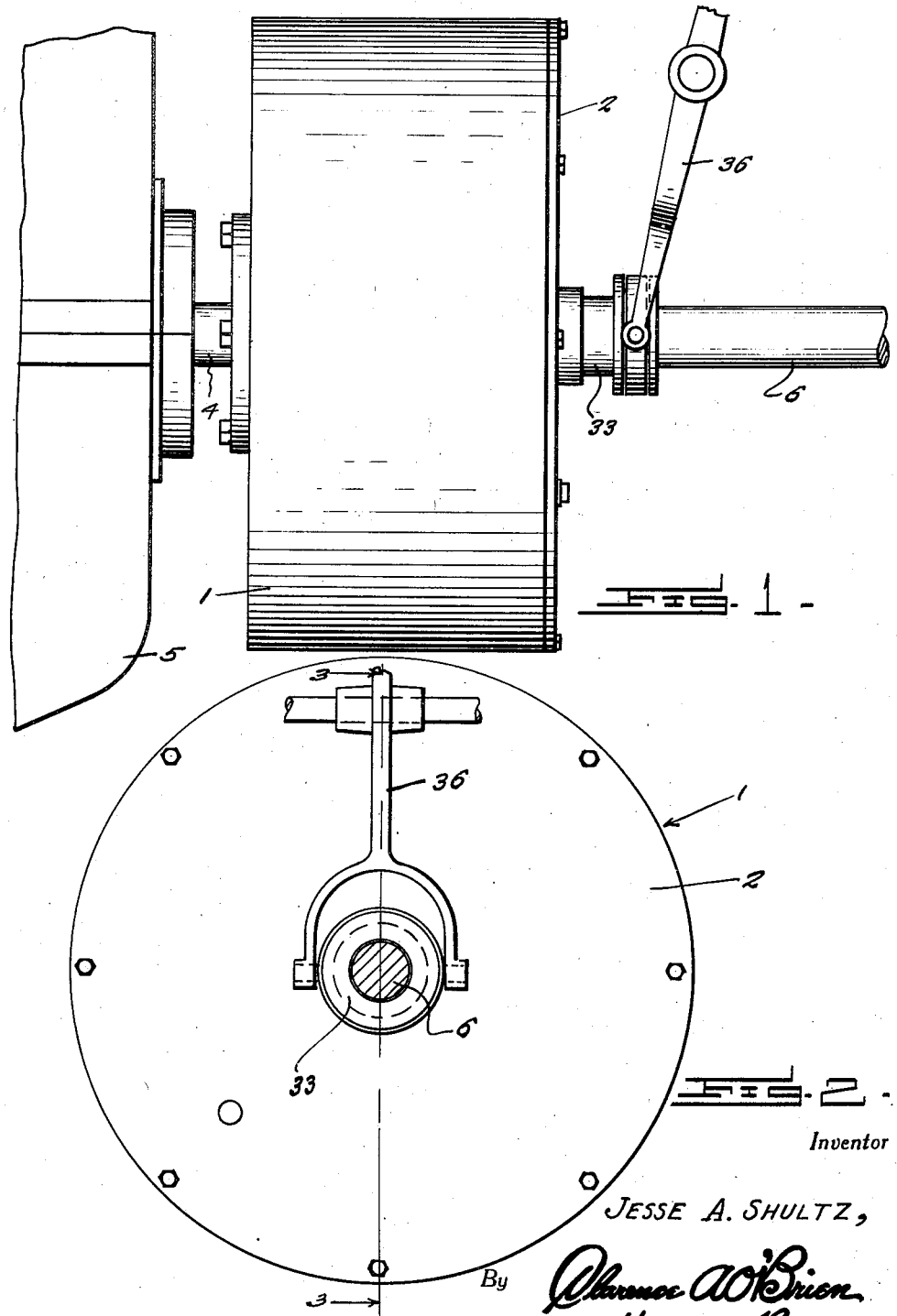
Figure 1 is a view in side elevation of a hydraulic transmission constructed in acordance with the present invention.
Figure 2 is a view in rear elevation thereof, the driven shaft being shown in cross section.

Referring now to the drawings in detail, it will be seen that the embodiment of the invention which has been illustrated comprises a housing 1 of suitable metal, said housing including a removable back plate 2. The housing 1 is firmly secured, as at 3, on the crank shaft 4 of an engine 5. It may be well to here state that the housing 1 constitutes a flywheel.

Journaled in the housing 1 and extending rearwardly therefrom through the plate 2 is a driven shaft 6. A bearing 7 is provided for the forward end portion of the driven shaft 6. Firmly secured in the forward end portion of the housing 1 is a gear 8. Mounted on the gear 8 is a comparatively small gear 9. It will be observed that the gears 8 and 9 are mounted concentrically relative to the forward end portion of the driven shaft 6. Keyed on the driven shaft 6 in the housing 1 and spaced rearwardly from the gear 9 is a gear 10.

Journaled on the driven shaft 6, between the gears 9 and 10, is a metallic wheel or member 11. A suitable bearing 12 is provided for the wheel 11. Journaled on the wheel 11 and projecting beyond the opposite sides thereof are stub shafts 13. Fixed on the forward end portions of the shafts 13 are planetary gears 14 which are in mesh with the gear 9. Fixed on the rear end portions of the shafts 13 are comparatively small gears 15 which are in mesh with the gear 10.

Figure 3:
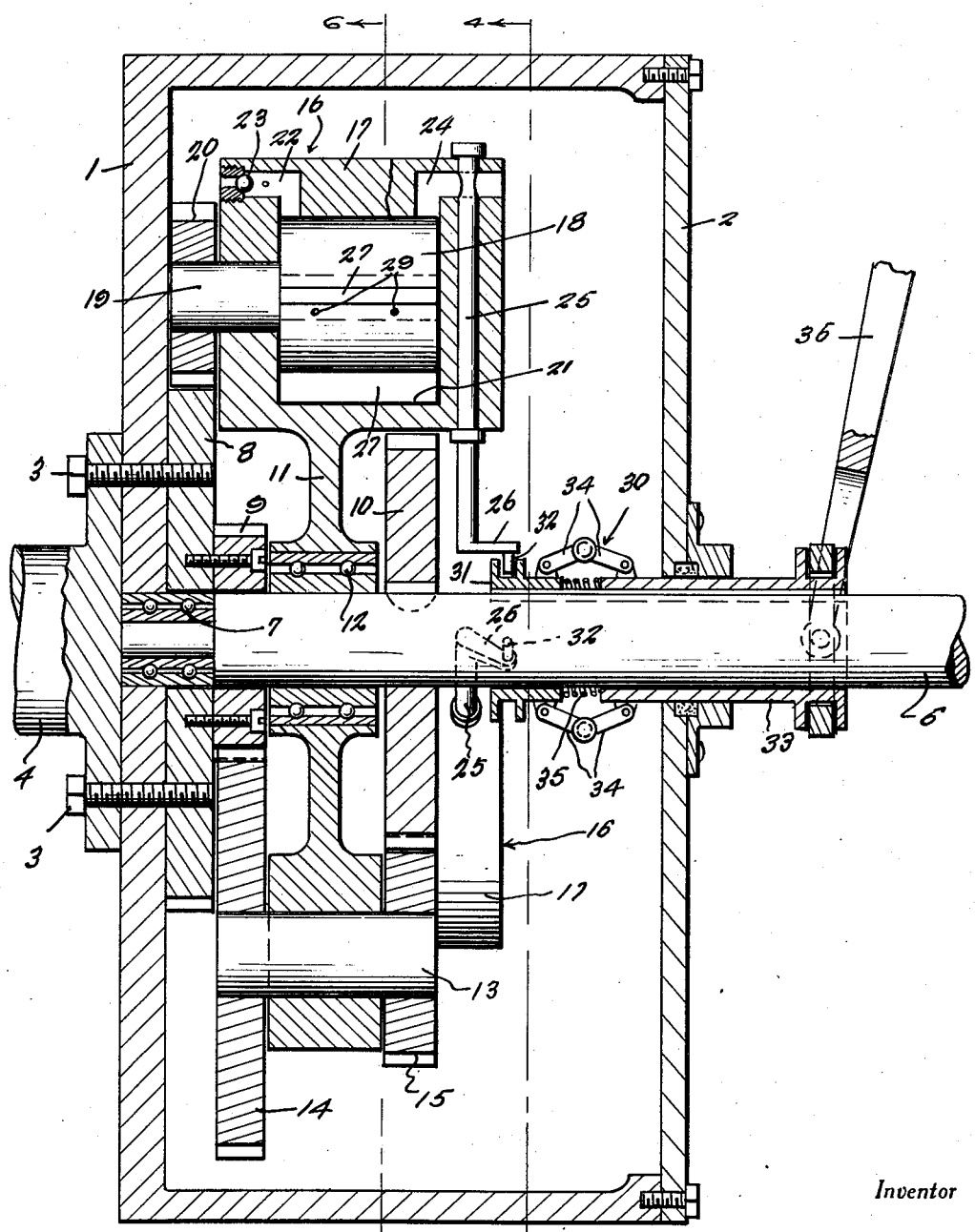
Figure 3 is a view in vertical longitudinal section, taken substantially on the line 3—3 of Figure 2.
Figure 4:
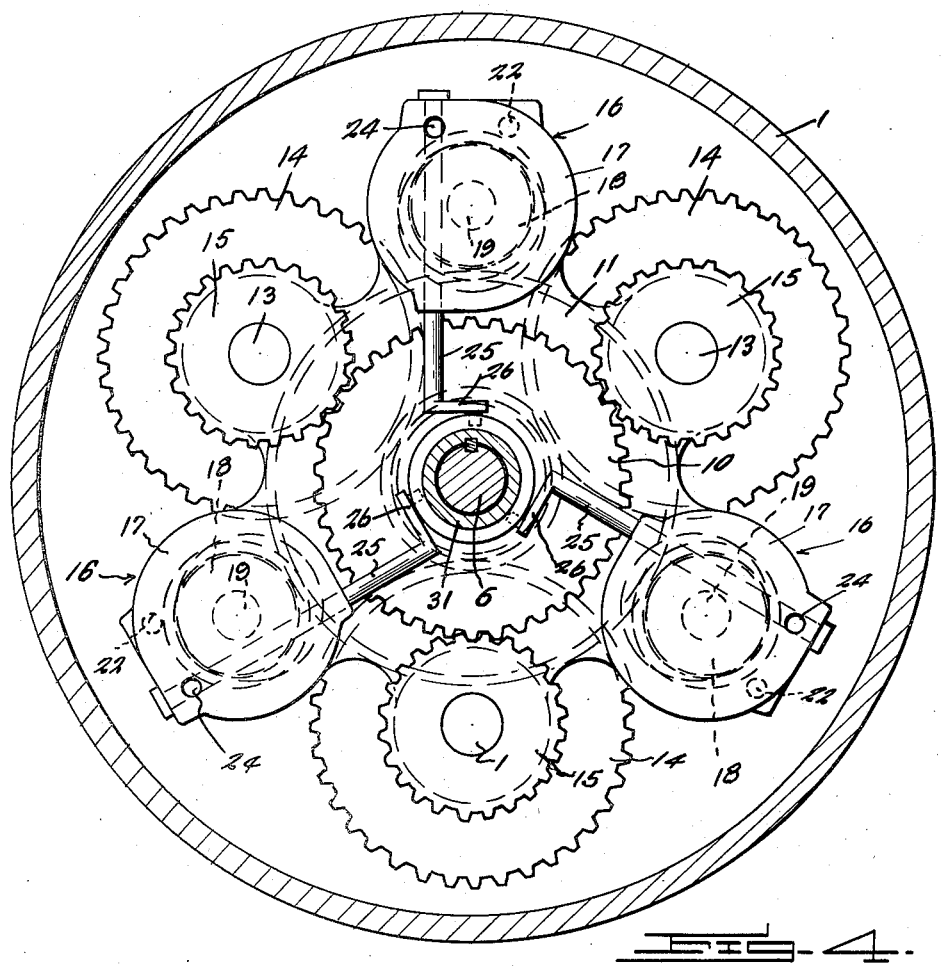
Figure 4 is a cross sectional view, taken substantially on the line 4—4 of Fig. 3.
Figure 5:
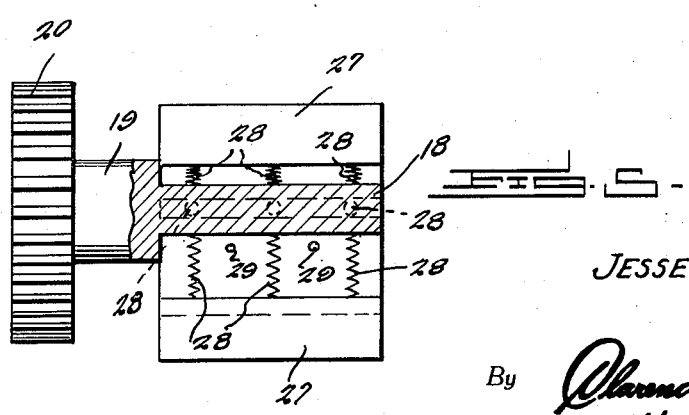
Figure 5 is a vertical sectional view through one of the pump rotors.

The wheel 11 also carries a plurality of fluid pumps which are designated generally by the reference numeral 16. It is here stated that the housing 1 is for the reception of a suitable fluid. The pumps 16 include casings 17 having mounted therein rotors 18. The shafts 19 of the rotors 18 have fixed thereon gears 20 which are in mesh with the gear 8. As best seen in Fig. 3 of the drawings, the shafts 19 are journaled in the forward ends of the casings 17. The rotors 18 are operable in off center chambers 21 in the casings 17.

Inlets 22 are provided in the casings 17 for the entrance of fluid into the chambers 21 from the housing 1. Back flow of the fluid in the inlets 22 is prevented by check valves 23. The outlets 24 of the pumps 16 are controlled by valves 25 which are rotatably mounted in the casings 17. Arms 26 are provided on one end of the valves 25.

Figure 6:
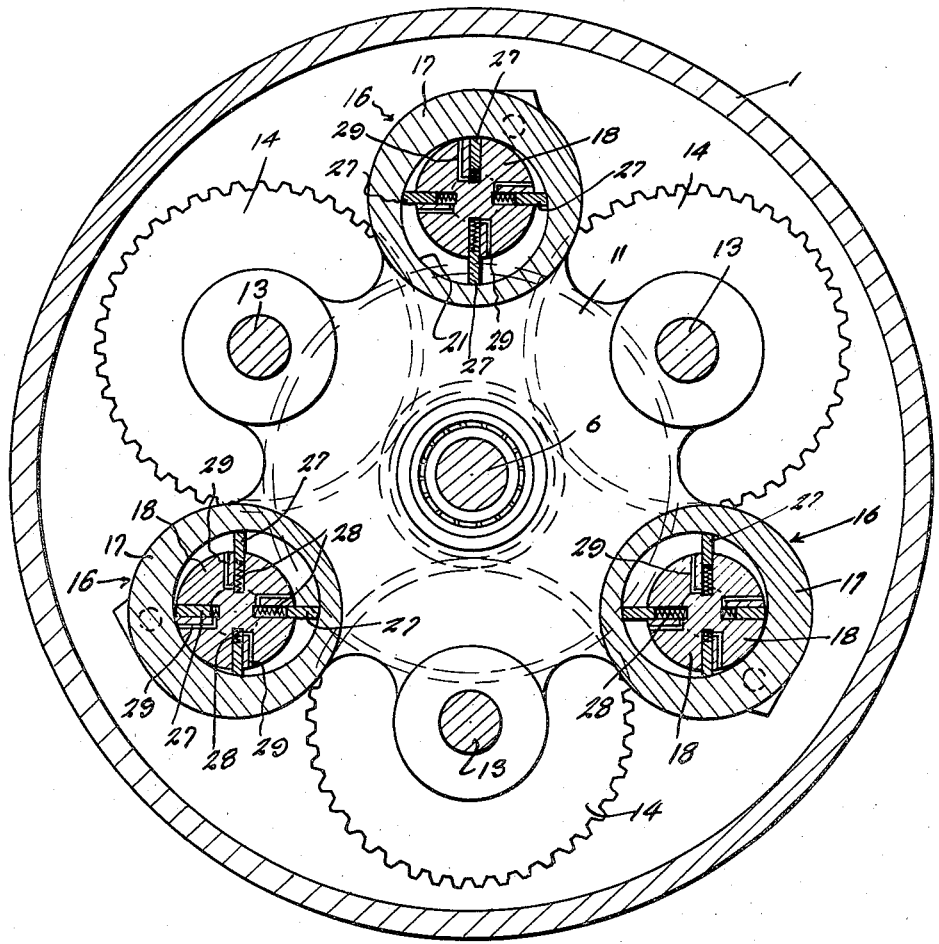
Figure 6 is a cross sectional view, taken substanitally on the line 6—6 of Fig. 3.

Referring now to Fig. 6 of the drawings, it will be observed that the rotors 18 of the pumps 16 have slidably mounted therein vanes 27 which travel on the peripheries of the off center chambers 21. Springs 28 yieldingly urge the vanes 27 outwardly. The channels in the rotors 18 which accommodate the vanes 27 have communicating therewith vents or ducts 29 which assure freedom of movement of said vanes at all times.

The valves 25 are controlled by a governor on the driven shaft 6 which is designated generally by the reference numeral 30. The governor 30 includes a collar 31 which is splined on the driven shaft 6. Pins 32 on the arms 26 are engaged in the collar 31 for operatively connecting the valves 25 to said collar. The governor 30 further includes a comparatively long sleeve 33 which is spined on the driven shaft 6 and which extends through the plate 2 of the housing 1. Weighted toggle links 34 operatively connect the collar 31 to the sleeve 33. A coil spring 35 is mounted on the driven shaft 6 between the collar 31 and the sleeve 33. The reference numeral 36 designates a manually actuated lever which is operatively connected to the sleeve 33.

It is thought that the operation of the transmission will be readily apparent from a consideration of the foregoing. Of course, the housing 1 and the gears 8 and 9 rotate in unison with the shaft 4. When the shaft 4 is stationary the valves 25 are normaly in open position. However, the construction and arrangement is such that, even when in open position, the valves 25 set up some resistance to the discharge of fluid from the pumps 16. Thus, when the shaft 4 begins to turn the shaft 6 is picked up and caused to turn but at a very low ratio of speed. The gear 8 drives the pumps 16 through the gears 20, the fluid entering said pumps through the inlets 22 and returning to the housing through the outlets 24. The load on the driven shaft 6 causes the pump gears 20 to travel around the gear 8 in a direction opposite to the direction of rotation of said gear 8. Also, the resistance set up by the driven shaft 6 causes the plate or wheel 11 to rotate in a direction opposite to that of the applied power. As the shaft 6 picks up speed the valves 25 are progressively closed by the governor 30 thereby restricting the discharge of the fluid from the pumps 16 and consequently retarding the rotors 18. As this operation progresses the plate or wheel 11 gradually slows down and then begins to rotate in the same direction as the applied power or motion. When the valves 25 reach fully closed position the pumps 16 are locked and a direct drive from the shaft 4 to the shaft 6 is had. The valves 25 may be manually controlled through the medium of the lever 36. By operating the lever 36 the sleeve 33 may be moved inwardly or forwardly for compressing the coil spring 35 thereby preventing operation of the collar 31 by the weights of the governor 30 with the result that the valves 25 will be retained in closed or any other desired position regardless of the speed of rotation of the shaft 6.

It is believed that the many advantages of a hydraulic transmission constructed in accordance with the present invention will be readily understood and although a preferred embodiment of the device is as illustrated and described, it is to be understood that changes in the details of construction and in the combination and arrangement of parts may be resorted to which will fall within the scope of the invention as claimed.

What is claimed is:

1. A hydraulic transmission comprising a housing for the reception of a fluid, means connected to the housing for driving same, a driven shaft journaled in the housing, comparatively large and small coaxial gears fixed in one end portion of the housing, a gear fixed on the driven shaft, a member journaled on the driven shaft between the first and second named gears, fluid pumps mounted on said member for receiving fluid from the housing and returning said fluid to said housing, gears operatively connecting the pumps to the largest of the first named gears for actuation thereby, stub shafts journaled on said member, gears on one side of the member operatively connecting said stub shafts to the smaller of the first named gears for actuation thereby, gears on the other side of the member operatively connecting the second named gear to said stub shafts, valves for controlling the flow of fluid through the pumps, and means for actuating said valves.

2. A hydraulic transmission comprising a housing for the reception of a fluid, means connected to the housing for driving same, a driven shaft journaled in the housing, gears fixed in the housing, a gear fixed on the driven shaft, a member journaled on the driven shaft, fluid pumps mounted on said member for receiving fluid from the housing and returning said fluid to said housing, means operatively connecting the pumps to one of the first named gears for actuation thereby, stub shafts journaled on said member, gears operatively connecting said stub shafts to the other of the first named gears for actuation thereby, gears operatively connecting the second named gear to said stub shafts, valves for controlling the flow of fluid through the pumps, and means for actuating said valves, said means including a governor comprising a collar and a sleeve splined on the driven shaft, arms on the valves operatively engaged with the collar, weighted toggles operatively connecting the collar and sleeve, a coil spring interposed between the collar and sleeve on the driven shaft, and a hand lever operatively connected to the sleeve for compressing the coil spring for yieldingly securing the collar against actuation by the weighted toggles.

JESSE ALBERT SHULTZ.